US010883590B2

(12) United States Patent
Balsiger et al.

(10) Patent No.: US 10,883,590 B2
(45) Date of Patent: Jan. 5, 2021

(54) COMPOUND HARMONIC GEAR

(71) Applicant: Hamilton Sundstrand Corporation, Charlotte, NC (US)

(72) Inventors: Derick S. Balsiger, Mayer, AZ (US); Nicholas R. Van De Veire, Tempe, AZ (US); Zaffir A. Chaudhry, S. Glastonbury, CT (US); Huan Zhang, Glastonbury, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 753 days.

(21) Appl. No.: 15/644,388

(22) Filed: Jul. 7, 2017

(65) Prior Publication Data

US 2019/0011032 A1    Jan. 10, 2019

(51) Int. Cl.
*F16H 49/00* (2006.01)
*H02K 7/116* (2006.01)
*B64C 13/34* (2006.01)
*B64C 9/00* (2006.01)

(52) U.S. Cl.
CPC .......... *F16H 49/001* (2013.01); *H02K 7/116* (2013.01); *B64C 13/34* (2013.01); *B64C 2009/005* (2013.01); *F16H 2049/003* (2013.01)

(58) Field of Classification Search
CPC .................................................... F16H 49/001
USPC ......................................................... 74/640
See application file for complete search history.

(56) References Cited

U.S. PATENT DOCUMENTS

| 4,003,272 | A | * | 1/1977 | Volkov .................. F16H 49/001 74/640 |
| 4,715,247 | A | | 12/1987 | Honda et al. |
| 4,934,212 | A | | 6/1990 | Hofmeister |
| 5,720,101 | A | | 2/1998 | Foley et al. |
| 8,191,821 | B2 | | 6/2012 | Knight |
| 8,485,064 | B2 | | 7/2013 | Kanai |
| 9,157,517 | B2 | | 10/2015 | Lunin et al. |
| 9,228,651 | B2 | | 1/2016 | Waide |
| 9,360,098 | B2 | | 6/2016 | Roopnarine |
| 9,371,899 | B2 | | 6/2016 | Balsiger |
| 9,528,587 | B2 | | 12/2016 | Balsiger et al. |
| 9,605,742 | B2 | | 3/2017 | Lin |
| 10,584,782 | B2 | * | 3/2020 | Balsiger ............... F16H 49/001 |
| 2013/0333515 | A1 | | 12/2013 | Yen |

(Continued)

FOREIGN PATENT DOCUMENTS

| DE | 532053 C | 8/1931 |
| EP | 2012045 A1 | 1/2009 |

(Continued)

OTHER PUBLICATIONS

Partial Search Report dated Nov. 16, 2018, EP application No. 18170640.9, 15 pages.

*Primary Examiner* — Ha Dinh Ho
(74) *Attorney, Agent, or Firm* — Cantor Colburn LLP

(57) ABSTRACT

A compound harmonic actuator is provided and includes a motor, a flex spline disposed about the motor and a wave generator radially interposable between the motor and the flex spline. The wave generator being rotatably drivable by the motor and shaped to form the flex spline into an elliptical shape with an axis such that wave generator rotations drive rotations of the axis of the ellipse of the flex spline.

19 Claims, 4 Drawing Sheets

(56) References Cited

U.S. PATENT DOCUMENTS

| | | | |
|---|---|---|---|
| 2015/0354686 A1* | 12/2015 | Balsiger | H02K 7/116 74/640 |
| 2016/0010738 A1* | 1/2016 | Balsiger | F16H 49/001 74/640 |
| 2016/0152322 A1* | 6/2016 | Balsiger | H02K 41/06 244/99.2 |
| 2016/0229525 A1* | 8/2016 | Van De Veire | H02K 7/116 |
| 2016/0305528 A1 | 10/2016 | Shahipassand et al. | |
| 2017/0108107 A1 | 4/2017 | Balsiger et al. | |

FOREIGN PATENT DOCUMENTS

| | | |
|---|---|---|
| JP | S6272946 A | 4/1987 |
| WO | 2016164486 A1 | 10/2016 |

\* cited by examiner

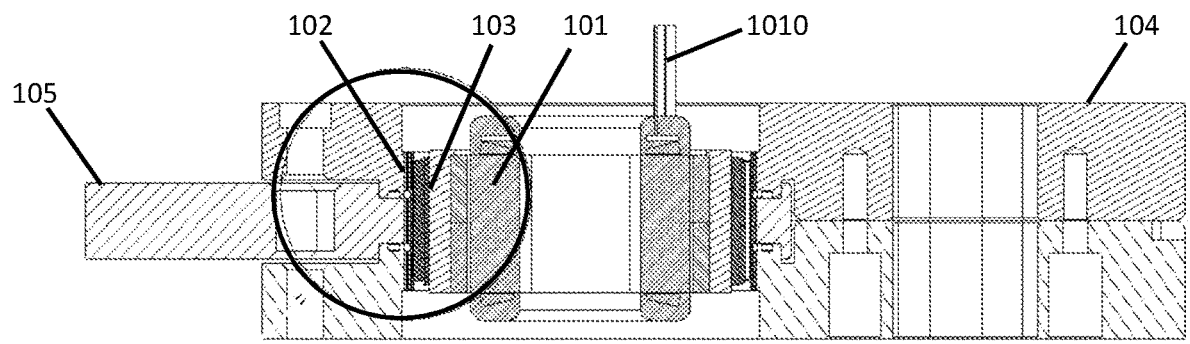
FIG. 5
FIG. 6
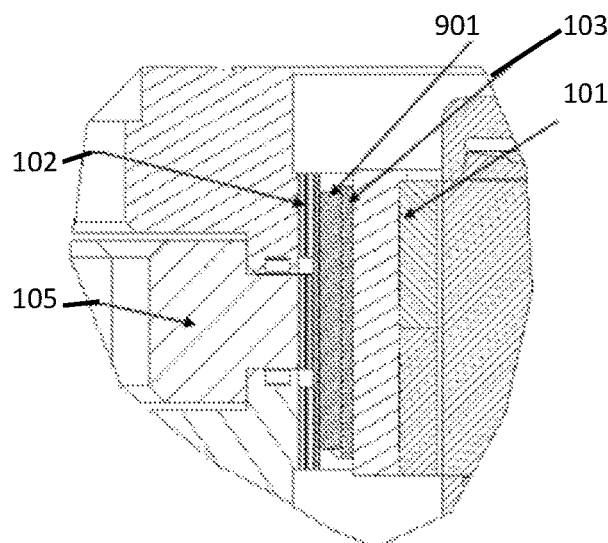
FIG. 7
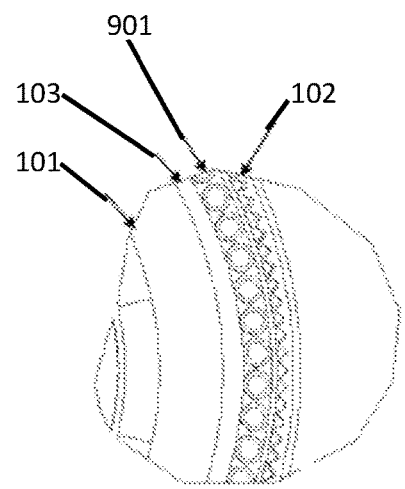

COMPOUND HARMONIC GEAR

STATEMENT OF FEDERAL SUPPORT

This invention was made with government support under FA8650-15-C-2500 awarded by United States Air Force. The government has certain rights in the invention.

BACKGROUND

The following description relates to an actuation system for an aircraft and, more specifically, to compound harmonic drive assemblies of a rotary actuator.

A compound harmonic drive can reduce backlash in a motion-control system. A compound harmonic gear of a compound harmonic drive allows high reduction ratios with concentric shafts and relatively low backlash and vibration. The structure and operation of a harmonic gear are based upon a relatively simple construction using elasto-mechanical properties of metal.

The harmonic gear typically includes a wave generator, a flexible (flex) spline and a ring gear. The wave generator is an oval or elliptical cam with a thin bearing placed around an outer circumference thereof and is mounted onto a shaft of a motor. The flex spline is thin and made of elastic metal with external teeth formed along an outer circumference thereof (or with internal teeth formed along an inner circumference thereof in an inverted harmonic drive). The ring gear is a rigid internal gear with internal teeth formed along an inner circumference thereof the ring gear has a different number of internal teeth than the flex spline has external teeth. The ring gear is attached to a gearbox along an outer circumference thereof. The wave generator, the flex spline and the ring gear are co-axially aligned with respect to each other.

In operation, the wave generator is mounted on a drive shaft and rotatable such that it imparts a continuously moving elliptical form or wave-like motion to the flex spline. This causes a meshing of the external teeth of the flex spline with the internal teeth of the ring gear at respective equidistant points of engagement or connection thereof to progress in a continuously rolling fashion. It also allows for full-teeth axial disengagement or disconnection at the points opposite a minor axis of the wave generator. A major axis of the flex spline actually rotates with the wave generator, so the points where the corresponding teeth mesh with each other revolve around a center point at a rate equal to that of the wave generator.

Since the flex spline has fewer external teeth than the ring gear has internal teeth and the full-teeth axial disconnect is made possible by the ellipticity of the wave generator, each complete revolution of the wave generator causes a circumferential displacement of the flex spline in relation to the ring gear. This displacement is always in a direction opposite to that of the rotation of the wave generator. That is, if the wave generator is rotating in a clockwise direction, the displacement of the flex spline is in a counter-clockwise direction and vice versa. In this way, the compound harmonic drive is capable of functioning as a speed reducer.

In an aircraft system, for example, a rotary electromechanical actuator (rotary EMA) is implemented mainly for ailerons, flaps, slats and spoiler and other flight-control surfaces. In this context, the compound harmonic drive is incorporated with the rotary EMA.

BRIEF DESCRIPTION

According to one aspect of the disclosure, a compound harmonic actuator is provided. The compound harmonic actuator includes a motor, a flex spline disposed about the motor and a wave generator radially interposable between the motor and the flex spline. The wave generator is rotatably drivable by the motor and shaped to form the flex spline into an elliptical shape with an axis such that wave generator rotations drive rotations of the axis of the ellipse of the flex spline. The wave generator includes a scalloped outer surface and roller bearings arranged circumferentially about the scalloped outer surface.

In accordance with additional or alternative embodiments, the compound harmonic actuator further includes a ground arm in which the motor is supportively disposable and an output arm which is drivable by the flex spline to pivot within a predefined range of angles relative to the ground arm.

In accordance with additional or alternative embodiments, the wave generator is shaped to form the flex spline into an irregular elliptical shape with multiple major axes.

In accordance with additional or alternative embodiments, the scalloped outer surface includes sequential ridges and lands.

In accordance with additional or alternative embodiments, a distal edge of each ridge is sharp.

In accordance with additional or alternative embodiments, a distal edge of each ridge is radially aligned with or terminal within respective central longitudinal axes of adjacent roller bearings.

In accordance with additional or alternative embodiments, the flex spline is formed as only a single unitary piece.

In accordance with additional or alternative embodiments, the flex spline includes a ground flex spline configured to interface with the wave generator and having a first number of external teeth, an output flex spline configured to interface with an output gear and having a second number of external teeth which is different from the first number and a coupling configured to interface with the respective first and second numbers of external teeth of the ground and output flex splines.

According to another aspect of the disclosure, a compound harmonic actuator is provided and includes a motor, a flex spline disposed about the motor and formed as only a single unitary piece and a wave generator radially interposable between the motor and the flex spline. The wave generator is rotatably drivable by the motor and shaped to form the flex spline into an elliptical shape with an axis such that wave generator rotations drive rotations of the axis of the ellipse of the flex spline.

In accordance with additional or alternative embodiments, the compound harmonic actuator further includes a ground arm in which the motor is supportively disposable and an output arm which is drivable by the flex spline to pivot within a predefined range of angles relative to the ground arm.

In accordance with additional or alternative embodiments, the wave generator is shaped to form the flex spline into an irregular elliptical shape with multiple major axes.

In accordance with additional or alternative embodiments, the wave generator includes a scalloped outer surface and roller bearings arranged circumferentially about the scalloped outer surface. The scalloped outer surface includes sequential ridges and lands. Each roller bearing rolls about a central longitudinal axis thereof in a corresponding land.

In accordance with additional or alternative embodiments, the single unitary piece of the flex spline includes a body integrally formed with a smooth interior diameter and external teeth.

According to yet another aspect of the disclosure, a compound harmonic actuator is provided and includes a motor, a flex spline disposed about the motor and a wave generator radially interposable between the motor and the flex spline. The wave generator is rotatably drivable by the motor and shaped to form the flex spline into an elliptical shape with an axis such that wave generator rotations drive rotations of the axis of the ellipse of the flex spline. The flex spline includes a ground flex spline configured to interface with the wave generator and having a first number of external teeth, an output flex spline configured to interface with an output gear and having a second number of external teeth which is different from the first number and a coupling configured to interface with the respective first and second numbers of external teeth of the ground and output flex splines.

In accordance with additional or alternative embodiments, the compound harmonic actuator further includes a ground arm in which the motor is supportively disposable and an output arm which is drivable by the output flex spline to pivot within a predefined range of angles relative to the ground arm.

In accordance with additional or alternative embodiments, the wave generator is shaped to form the flex spline into an irregular elliptical shape with multiple major axes.

In accordance with additional or alternative embodiments, the wave generator includes a scalloped outer surface and roller bearings arranged circumferentially about the scalloped outer surface. The scalloped outer surface includes sequential ridges and lands. Each roller bearing rolls about a central longitudinal axis thereof in a corresponding land.

In accordance with additional or alternative embodiments, the coupling includes a first ring gear having internal teeth to interface with the first number of external teeth of the ground flex spline, a second ring gear having internal teeth to interface with the second number of external teeth of the output flex spline and coupling pins disposed to secure the first and second ring gears.

In accordance with additional or alternative embodiments, the ground flex spline is provided as first and second ground flex splines on either side of the output flex spline.

In accordance with additional or alternative embodiments, the coupling includes first ring gears that each have internal teeth to interface with the first number of external teeth of each of the first and second ground flex splines, second ring gears that each have internal teeth to interface with the second number of external teeth of the output flex spline and first and second sets of coupling pins disposed to secure each of the first ring gears to one of the second ring gears.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 5 is a cutaway side view of the compound harmonic actuator of FIG. 1 taken along line 5-5 of FIG. 4;

FIG. 6 is an enlarged view of the encircled portion of FIG. 5;

FIG. 7 is an enlarged view of the encircled portion of FIG. 4;

DETAILED DESCRIPTION

Figure 1:
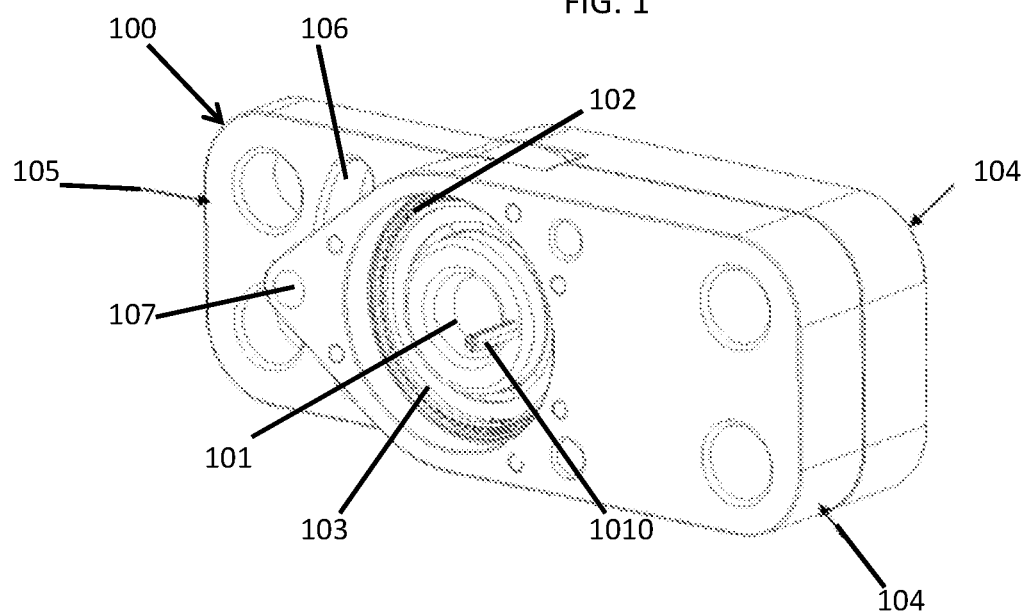
FIG. 1 is a perspective view of a compound harmonic actuator in accordance with embodiments.
Figure 2:
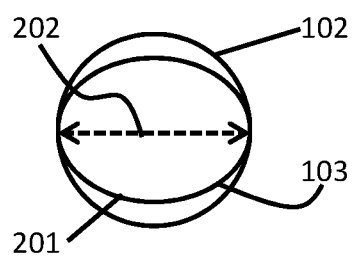
FIG. 2 is a schematic axial view of a wave generator of the compound harmonic actuator of FIG. 1 in accordance with alternative embodiments.
Figure 3:
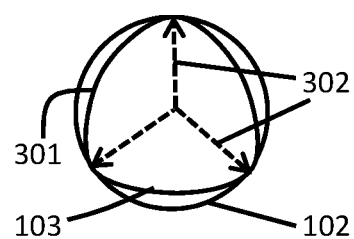
FIG. 3 is a schematic axial view of a wave generator of the compound harmonic actuator of FIG. 1 in accordance with alternative embodiments.
Figure 4:
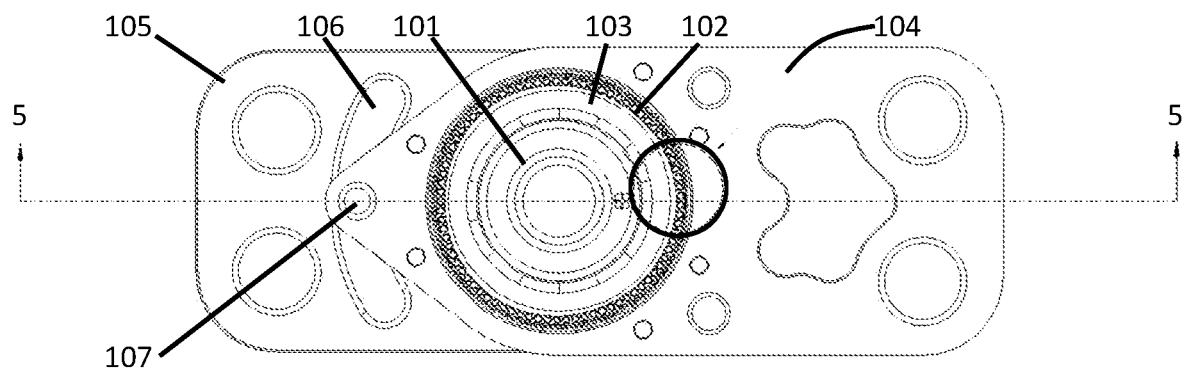
FIG. 4 is a top-down view of the compound harmonic actuator of FIG. 1.

As will be described below, a compound harmonic actuator is provided with at least one or more improvements. As a first example of the one or more improvements, a wave generator of the compound harmonic actuator may include a scalloped outer surface that secures roller bearings in place and negates a need for a cage. As a second example of the one or more improvements, a flex spline of the wave generator may include only a single unitary piece. As a third example of the one or more improvements, the flex spline of the wave generator may include a ground flex spline, an output flex spline and a coupling configured to interface with the ground and output flex splines. The first and second improvements may be employed together and the first and third improvements may be employed together.

With reference to FIGS. 1-7, a compound harmonic actuator 100 is provided. The compound harmonic actuator 100 includes a motor 101, a flex spline 102 and a wave generator 103. The motor 101 includes an interior stator with windings that are receptive of current and a rotor disposed about the interior stators. The rotor includes a circumferential array of magnets such that, when current is supplied to the windings via wiring 1010, a flux moment is induced in the rotor which causes the rotor to rotate. This rotary motion serves to drive corresponding rotations of the wave generator 103. The flex spline 102 is disposed about the motor 101 with the wave generator 103 radially interposable between the motor 101 and the flex spline 102. The wave generator 103 is rotatably drivable by the motor 101 as noted above and is shaped to form the flex spline 102 into an elliptical shape 201 with a major axis 202 (see FIG. 2) or into an irregular elliptical shape 301 with multiple major axes 302 (see FIG. 3). The rotational driving of the wave generator 103 drives corresponding rotations of the major axis 202 or the major axes 302 of the flex spline 102.

The flex spline 102 has a number of external teeth that can interface with a number of internal teeth of an output gear, an output arm or a coupling as will be described below. Since the number of the external teeth of the flex spline 102 is different than the number of internal teeth of the output gear, the output arm or the coupling, the rotations of the major axis 202 of the major axes 302 of the flex spline 102 drive corresponding (reverse) and geared-down rotations of the output gear, the output arm or the coupling.

The compound harmonic actuator 100 may further include one or more ground arms 104 and an output arm 105. The motor 101 is supportively disposable within the one or more ground arms 104 and the output arm is drivable by the flex spline 102 to pivot within a predefined range of angles relative to the one or more ground arms 104. In some cases, the compound harmonic actuator 100 may be employed to control certain surfaces of a wing of an aircraft where a relatively large amount of torque is required to pivot an aerodynamic surface relative to another aerodynamic surface. For example, the one or more ground arms 104 may be affixed to an aircraft wing spar and the output arm 105 may be affixed to an aileron of the aircraft wing. In such cases, as the output arm 105 pivots relative to the one or more ground arms 104, the aileron correspondingly pivots relative to the spar. The angular range of such pivoting is limited by software which prevents an over rotation in either direction of the motor 101 and by mechanical features (e.g., the guide 106 of the output arm 105 and the boss 107 of the one or more ground arms 104 which moves through the guide 106 during pivoting).

Figure 8:
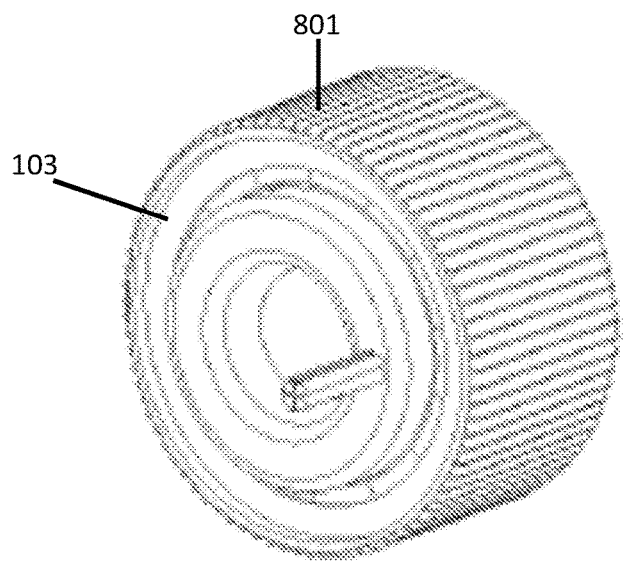
FIG. 8 is a perspective view of a wave generator of the compound harmonic actuator of FIGS. 1-7 in accordance with embodiments.
Figure 9:
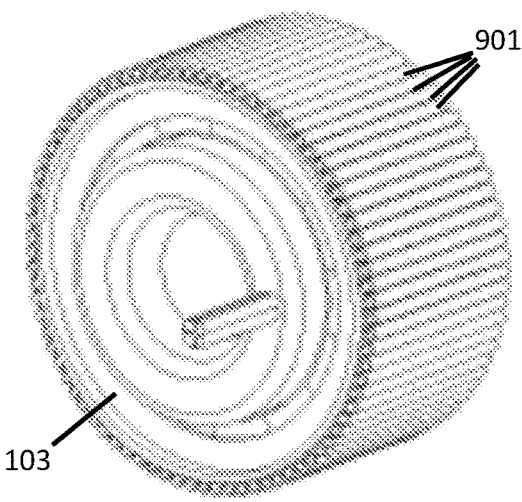
FIG. 9 is a perspective view of roller bearings provided about the wave generator of FIG. 8.
Figure 10:
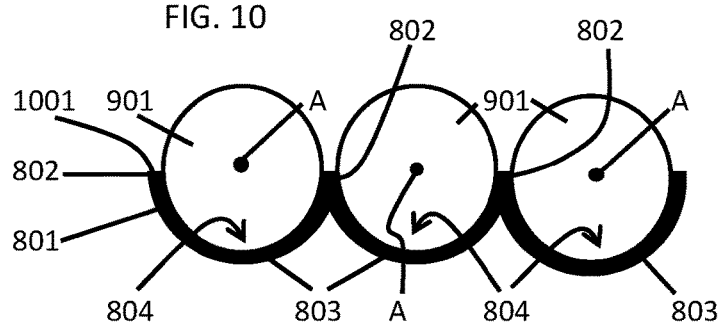
FIG. 10 is an enlarged axial view of a portion of the wave generator of FIG. 8.

While conventional wave generators are typically provided with smooth outer surfaces and cages that secure roller bearings in place, with reference to FIGS. 8-10, the wave generator 103 may include a scalloped outer surface 801 and roller bearings 901 which are arranged circumferentially and side-by-side about the scalloped outer surface 801 and which are respectively secured in placed by each corresponding scallop. That is, as shown in FIG. 10, the scalloped outer surface 801 is formed of or includes sequential ridges 802 and lands 803 where a sequential pair of ridges 802 and the intervening land 803 forms an individual scallop 804 in which an individual roller bearing 901 is rotatably disposable to rotate about a central longitudinal axis A thereof. In accordance with embodiments, a distal edge 1001 of each ridge 802 may be relatively sharp and may be radially aligned with or terminal within respective central longitudinal axes of adjacent roller bearings 901.

Figure 11:
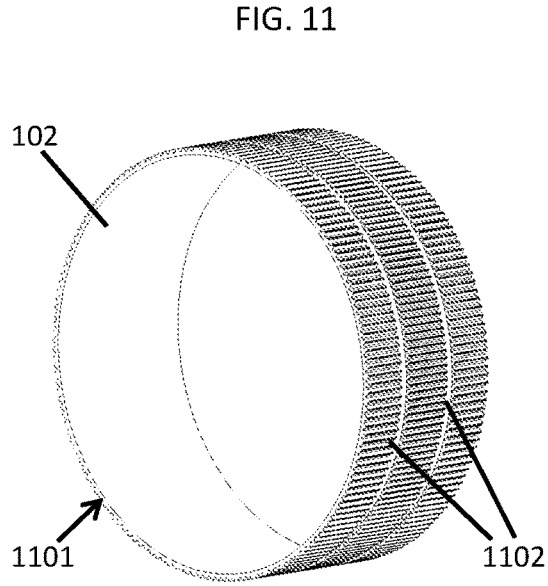
FIG. 11 is a perspective view of a flex spline of the compound harmonic actuator of FIGS. 1-7 in accordance with embodiments.
Figure 12:
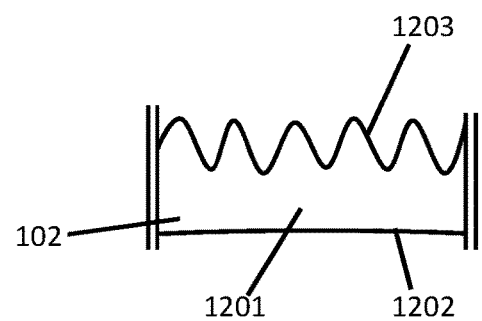
FIG. 12 is an enlarged axial portion of a section of the flex spline of FIG. 10.

While conventional flex splines are typically provided as a central flex spline part from which two inner rings extend and lateral flex spline parts that are fittable over exterior surfaces of the two inner rings, with reference to FIGS. 11 and 12, the flex spline 102 is formed as only a single unitary piece 1101. As shown in FIG. 12, this single unitary piece 1101 includes a body 1201 that is integrally formed with a smooth interior diameter (ID) surface 1202 and external teeth 1203. The smooth ID surface 1202 is impinged upon by the roller bearings 901 (or by a bearing race) of the flex spline 102 as the flex spline 102 is rotated by the wave generator 103. As shown in FIG. 11, the smooth ID surface 1202 is continuous and without a seam or a break whereas, in accordance with embodiments, the external teeth 1203 may be formed to define one or more machining slots 1102 which run circumferentially about the flex spline 102. The machining slots 1102 may be produced as a result of the machining of the external teeth 1203 and are not specifically required. Where the machining slots 1102 are provided, however, they define groups of external teeth that may have similar or different numbers of external teeth.

Figure 13:
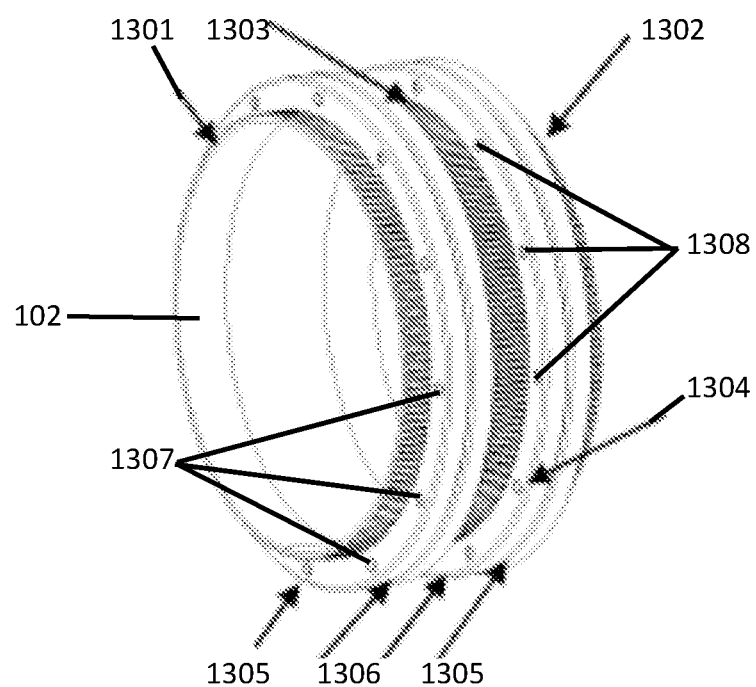
FIG. 13 is a perspective view of a flex spline of the compound harmonic actuator of FIGS. 1-7 in accordance with embodiments.

In accordance with further embodiments and, with reference to FIG. 13, the flex spline 102 may include first and second ground flex splines 1301 and 1302, an output flex spline 1303 and a coupling 1304. The first and second ground flex splines 1301 and 1302 are disposed on either side of the output flex spline 1303. The coupling 1304 includes first ring gears 1305 that have internal teeth, second ring gears 1306 that have internal teeth and first and second sets of coupling pins 1307 and 1308 that are disposed to secure each of the first ring gears 1305 to a corresponding one of the second ring gears 1306.

The respective IDs of the first and second ground flex splines 1301 interface with the rollers 901 of the wave generator 103. The first and second ground flex splines 1301 and 1302 have a first number of external teeth that interface with internal teeth of for example the one or more ground arms 104 and the internal teeth of the first ring gears 1305. The output flex spline 1303 has a second number of external teeth, which is different from the first number. These external teeth interface with an output gear, such as the output arm 105, and with the internal teeth of the second ring gears 1306.

The flex spline 102 of FIG. 13 has unique characteristics since the flex spline 102 needs to deform constantly due to the nature of the compound harmonic drive and since the flex spline 102 needs to transmit torque between the first and second ground flex splines 1301 and 1302 and the output flex spline 1303.

Thus, in operation, the wave generator 103 pushes the first and second ground flex splines 1301 and 1302 into the first ring gears 1305 by straining the flex spline 102. This strain results in cyclic stresses which can lead to fatigue and one method to reduce the stresses is to make the flex spline 102 relatively thin. While this would reduce the stress associated with the induced wave generator deformation, it reduces the ability of the flex spline 102 to transmit torque. The coupling 104 addresses this issues and makes it possible to transmit torque from the first and second ground flex splines 1301 and 1302 to the output flex spline 1303 (here a thickness of the flex spline 102 can be based on the stresses induced by deformation caused by the wave generator 103).

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A compound harmonic actuator, comprising:
    a motor;
    a flex spline disposed about the motor; and
    a wave generator radially interposable between the motor and the flex spline and rotatably drivable by the motor and shaped to form the flex spline into an elliptical shape with an axis such that wave generator rotations drive rotations of the axis of the ellipse of the flex spline,
    the wave generator comprising a scalloped outer surface and roller bearings arranged circumferentially about the scalloped outer surface,
    wherein the flex spline comprises a ground flex spline configured to interface with the wave generator and having a first number of external teeth, an output flex spline configured to interface with an output gear and having a second number of external teeth which is different from the first number and a coupling configured to interface with the respective first and second numbers of external teeth of the ground and output flex splines.

2. The compound harmonic actuator according to claim 1, further comprising:
a ground arm in which the motor is supportively disposable; and
an output arm which is drivable by the flex spline to pivot within a predefined range of angles relative to the ground arm.

3. The compound harmonic actuator according to claim 1, wherein the wave generator is shaped to form the flex spline into an irregular elliptical shape with multiple major axes.

4. The compound harmonic actuator according to claim 1, wherein the scalloped outer surface comprises sequential ridges and lands.

5. The compound harmonic actuator according to claim 4, wherein a distal edge of each ridge is sharp.

6. The compound harmonic actuator according to claim 4, wherein a distal edge of each ridge is radially aligned with or terminal within respective central longitudinal axes of adjacent roller bearings.

7. The compound harmonic actuator according to claim 1, wherein the flex spline is formed as only a single unitary piece.

8. A compound harmonic actuator, comprising:
a motor;
a flex spline disposed about the motor and formed as only a single unitary piece; and
a wave generator radially interposable between the motor and the flex spline,
the wave generator being rotatably drivable by the motor and shaped to form the flex spline into an elliptical shape with an axis such that wave generator rotations drive rotations of the axis of the ellipse of the flex spline,
wherein the flex spline comprises a ground flex spline configured to interface with the wave generator and having a first number of external teeth, an output flex spline configured to interface with an output gear and having a second number of external teeth which is different from the first number and a coupling configured to interface with the respective first and second numbers of external teeth of the ground and output flex splines.

9. The compound harmonic actuator according to claim 8, further comprising:
a ground arm in which the motor is supportively disposable; and
an output arm which is drivable by the flex spline to pivot within a predefined range of angles relative to the ground arm.

10. The compound harmonic actuator according to claim 8, wherein the wave generator is shaped to form the flex spline into an irregular elliptical shape with multiple major axes.

11. The compound harmonic actuator according to claim 8, wherein the wave generator comprises a scalloped outer surface and roller bearings arranged circumferentially about the scalloped outer surface, wherein:
the scalloped outer surface comprises sequential ridges and lands,
each roller bearing rolls about a central longitudinal axis thereof in a corresponding land.

12. The compound harmonic actuator according to claim 8, wherein the single unitary piece of the flex spline comprises a body integrally formed with a smooth interior diameter and external teeth.

13. A compound harmonic actuator, comprising:
a motor;
a flex spline disposed about the motor; and
a wave generator radially interposable between the motor and the flex spline and rotatably drivable by the motor and shaped to form the flex spline into an elliptical shape with an axis such that wave generator rotations drive rotations of the axis of the ellipse of the flex spline,
the flex spline comprising:
a ground flex spline configured to interface with the wave generator and having a first number of external teeth;
an output flex spline configured to interface with an output gear and having a second number of external teeth which is different from the first number; and
a coupling configured to interface with the respective first and second numbers of external teeth of the ground and output flex splines.

14. The compound harmonic actuator according to claim 13, further comprising:
a ground arm in which the motor is supportively disposable; and
an output arm which is drivable by the output flex spline to pivot within a predefined range of angles relative to the ground arm.

15. The compound harmonic actuator according to claim 13, wherein the wave generator is shaped to form the flex spline into an irregular elliptical shape with multiple major axes.

16. The compound harmonic actuator according to claim 13, wherein the wave generator comprises a scalloped outer surface and roller bearings arranged circumferentially about the scalloped outer surface, wherein:
the scalloped outer surface comprises sequential ridges and lands,
each roller bearing rolls about a central longitudinal axis thereof in a corresponding land.

17. The compound harmonic actuator according to claim 13, wherein the coupling comprises:
a first ring gear having internal teeth to interface with the first number of external teeth of the ground flex spline;
a second ring gear having internal teeth to interface with the second number of external teeth of the output flex spline; and
coupling pins disposed to secure the first and second ring gears.

18. The compound harmonic actuator according to claim 13, wherein the ground flex spline is provided as first and second ground flex splines on either side of the output flex spline.

19. The compound harmonic actuator according to claim 18, wherein the coupling comprises:
first ring gears that each have internal teeth to interface with the first number of external teeth of each of the first and second ground flex splines;
second ring gears that each have internal teeth to interface with the second number of external teeth of the output flex spline; and first and second sets of coupling pins disposed to secure each of the first ring gears to one of the second ring gears.

\* \* \* \* \*